(12) United States Patent
Princivalle

(10) Patent No.: US 12,209,594 B2
(45) Date of Patent: Jan. 28, 2025

(54) TURBOMACHINE STRUCTURE WITH THREE AIR FLOWS

(71) Applicants: SAFRAN AERO BOOSTERS, Herstal (BE); GENERAL ELECTRIC COMPANY, Schenectady, NY (US)

(72) Inventor: Rémy Henri Pierre Princivalle, Herstal (BE)

(73) Assignees: Safran Aero Boosters, Herstal (BE); General Electric Company, Schenectady, NY (US)

( * ) Notice: Subject to any disclaimer, the term of this patent is extended or adjusted under 35 U.S.C. 154(b) by 0 days.

(21) Appl. No.: 18/571,103

(22) PCT Filed: Jun. 18, 2021

(86) PCT No.: PCT/EP2021/066678
§ 371 (c)(1),
(2) Date: Jun. 12, 2024

(87) PCT Pub. No.: WO2022/262998
PCT Pub. Date: Dec. 22, 2022

(65) Prior Publication Data
US 2024/0369067 A1  Nov. 7, 2024

(51) Int. Cl.
*F04D 29/32* (2006.01)
*F04D 29/30* (2006.01)

(52) U.S. Cl.
CPC .......... *F04D 29/324* (2013.01); *F04D 29/30* (2013.01); *F05D 2260/213* (2013.01)

(58) Field of Classification Search
CPC .. F04D 29/324; F04D 29/30; F05D 2260/213; F05D 2220/324; F02C 7/14; F02C 7/18; F02K 3/02
See application file for complete search history.

(56) References Cited

U.S. PATENT DOCUMENTS

| 4,999,994 A | * | 3/1991 | Rüd | ........................ F02C 7/14 416/174 |
| 5,048,288 A | * | 9/1991 | Bessette | .................. F01D 11/24 415/116 |

(Continued)

FOREIGN PATENT DOCUMENTS

| EP | 2348210 A1 | 7/2011 |
| EP | 2383441 A2 | 11/2011 |
| EP | 2383441 A3 | 4/2017 |

OTHER PUBLICATIONS

International Search Report to corresponding PCT/EP2021/066678 mailed on Mar. 7, 2022.

(Continued)

*Primary Examiner* — Jesse S Bogue
(74) *Attorney, Agent, or Firm* — Sandberg Phoenix & von Gontard, P.C.

(57) ABSTRACT

A turbomachine of the type with an unducted fan, comprising: a separation nozzle splitting an air flow into a primary flow and a secondary flow; a compressor compressing the primary flow; and an air/oil heat exchanger; wherein the exchanger is positioned in a channel through which a tertiary flow passes, the tertiary flow being drawn from the secondary flow upstream of the exchanger and meeting at least one annular row of rotor blades of the compressor downstream of the exchanger.

15 Claims, 2 Drawing Sheets

(56) References Cited

U.S. PATENT DOCUMENTS

| | | | | |
|---|---|---|---|---|
| 5,357,742 A * | 10/1994 | Miller | ...................... | F02C 7/18 |
| | | | | 60/39.83 |
| 6,000,210 A * | 12/1999 | Negulescu | ............. | B64D 33/10 |
| | | | | 60/39.83 |
| 6,282,881 B1 * | 9/2001 | Beutin | ...................... | F02C 7/14 |
| | | | | 60/226.3 |
| 10,494,949 B2 * | 12/2019 | Rambo | ................... | F01D 25/14 |
| 2011/0182723 A1 * | 7/2011 | Rinjonneau | ............... | F02C 6/08 |
| | | | | 415/178 |
| 2021/0108597 A1 | 4/2021 | Ostdiek et al. | | |

OTHER PUBLICATIONS

Written Opinion to corresponding PCT/EP2021/066678 mailed on Mar. 7, 2022.

* cited by examiner

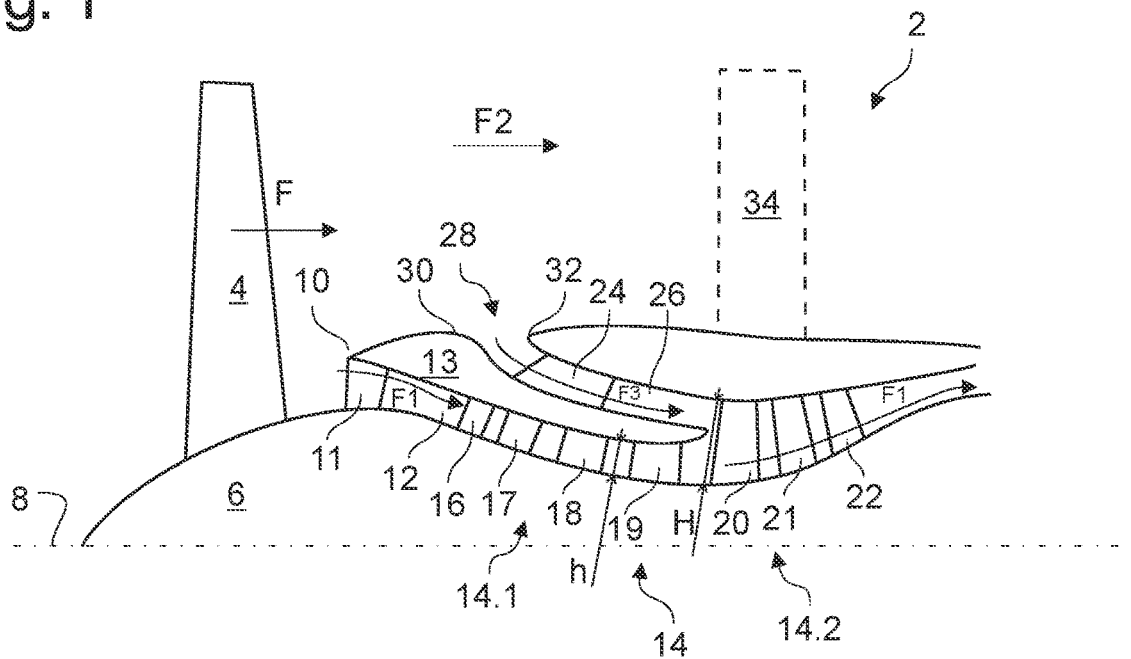
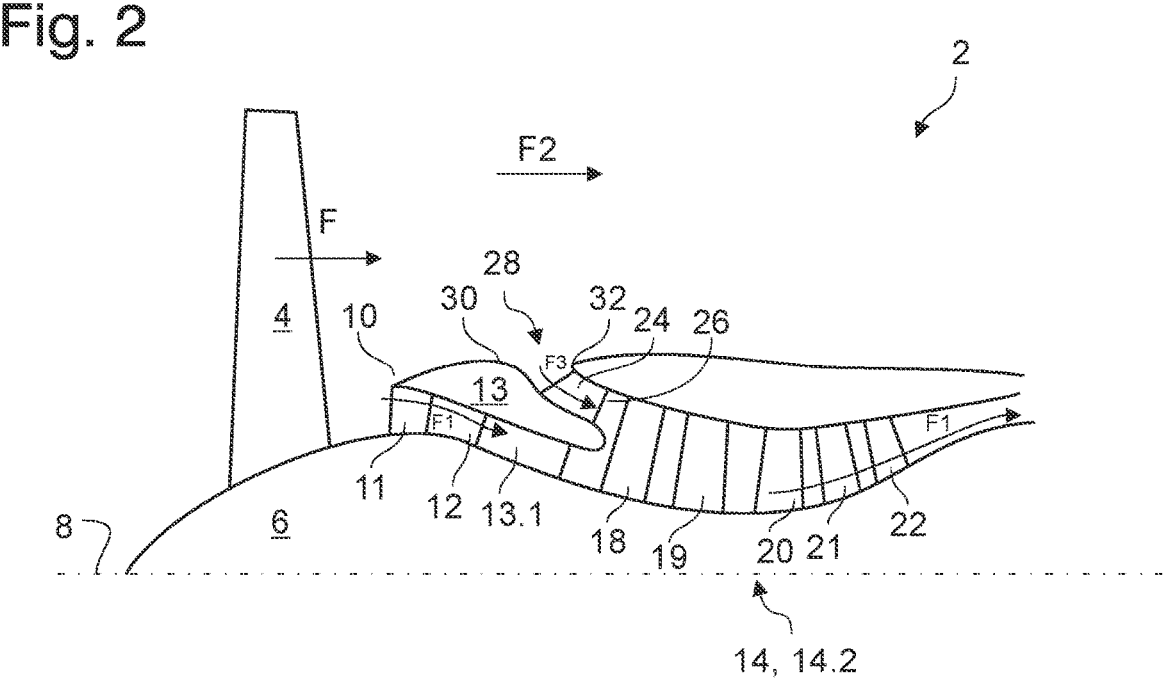

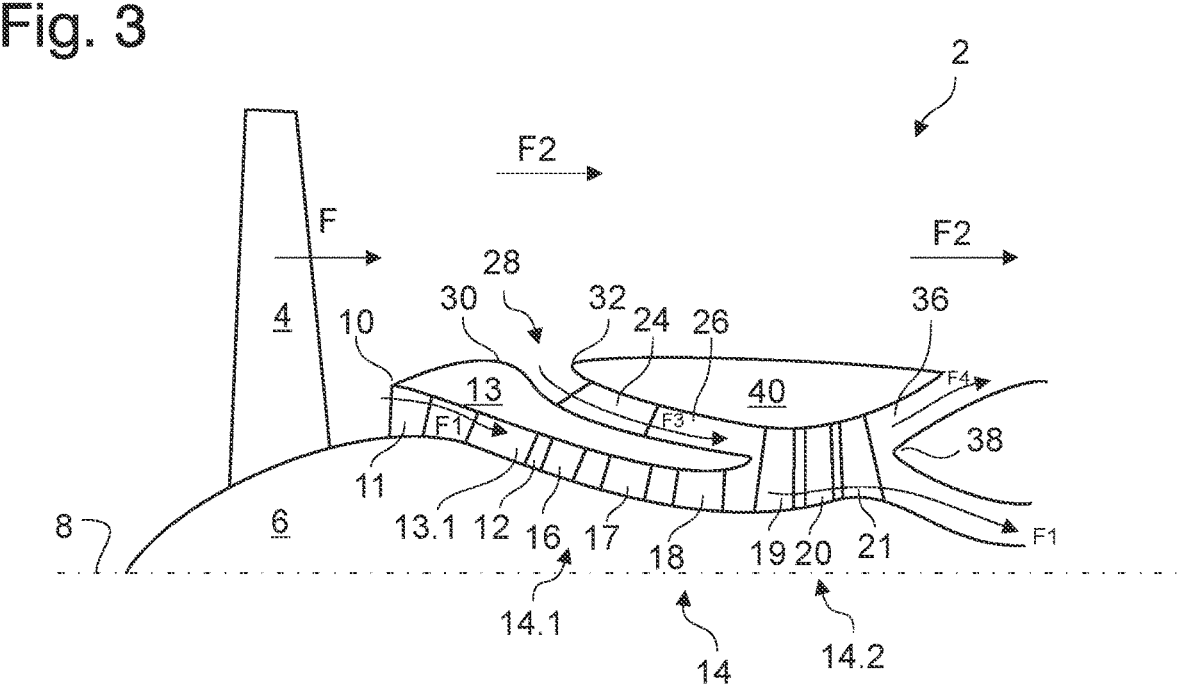
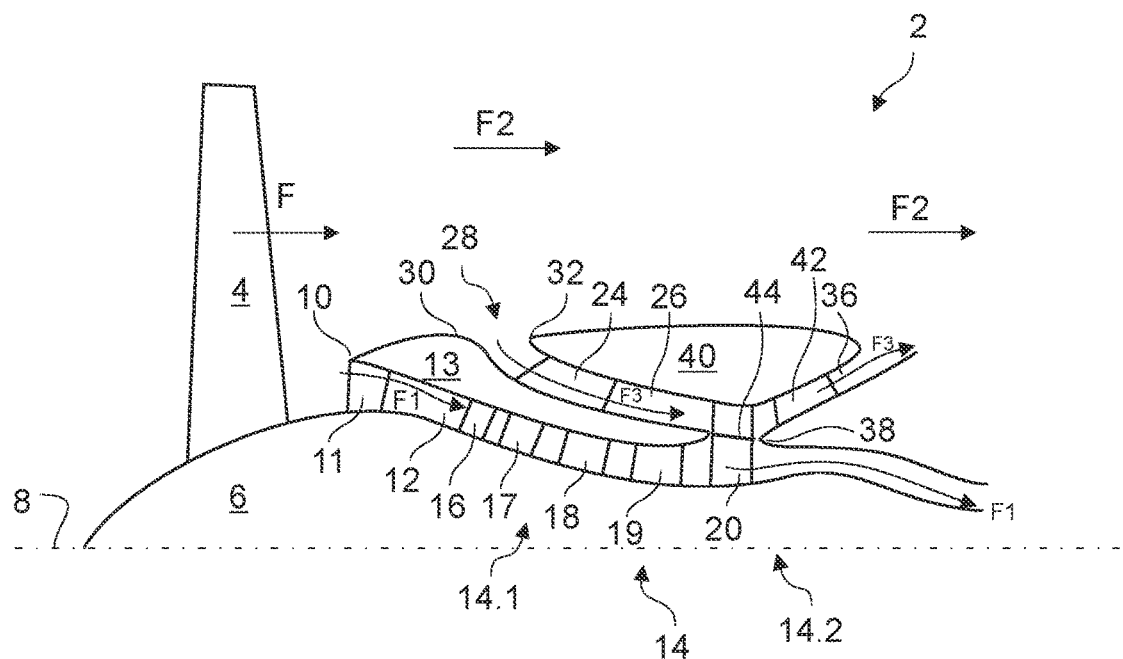

TURBOMACHINE STRUCTURE WITH THREE AIR FLOWS

The present invention is the US national stage under 35 U.S.C. § 371 of International Application No. PCT/EP2021/066678 which was filed on Jun. 18, 2021, the content of which (text, drawings and claims) is incorporated here by reference in its entirety.

FIELD

The invention relates to the design of a turbomachine, and more particularly to a turbomachine of the unducted fan type. The invention relates to the arrangement of the heat exchanger for cooling the turbomachine oil.

BACKGROUND

In a ducted turbomachine (turbojet), it is known to have one or more heat exchanger(s) in the secondary flow, that is to say downstream of the fan.

The absence of a fairing around the secondary flow in turboprop engines makes this arrangement impossible and the exchangers are therefore supplied with cold air by a fan external to the engine. This solution is neither compact nor light, and reduces the efficiency of the motor since part of the motor's energy is necessary to drive this additional fan.

Application WO 2020/084271 A1 describes a so-called fast propeller, or "open-rotor" motor (for example of the CROR "counter-rotating open rotor" type, or USF "unducted single fan"). In this type of structure, the airflow speed is too low at low aircraft speed for cooling to be sufficient, and the airflow speed is too high at cruising speed, resulting in energy losses. resulting from the drag of the exchangers. The known solution for turbojets is therefore not suitable for this type of engine, and a very large external fan is necessary to ensure the significant heat exchange requirements.

In short, the known technical solutions take an air directed towards the exchanger which is either an air too hot to effectively cool the oil, or an air having a speed too high for the aerodynamic or thrust losses to be negligible.

Added to this is the constraint linked to the fragility of the heat exchanger which cannot be placed directly upstream of the turbomachine, in particular because of the risk of impact with foreign bodies which could penetrate into the turbomachine.

SUMMARY

The invention aims to resolve the drawbacks of the design/manufacture of state-of-the-art turbomachines. In particular, the invention aims to propose a structure which allows effective cooling in a restricted space without hindering the efficiency of the turbomachine.

The invention relates to a turbomachine of the unducted fan type, comprising: a separation nozzle splitting an air flow into a primary flow and a secondary flow; a compressor compressing the primary flow; and an air/oil heat exchanger; wherein the exchanger is positioned in a channel through which a tertiary flow passes, the tertiary flow being drawn from the secondary flow upstream of the exchanger and meeting at least one annular row of rotor blades of the compressor downstream of the exchanger.

The turbomachine can take the form of a turboprop or an open-rotor turbomachine (e.g. CROR "counter-rotating open rotor", or USF "unducted single fan").

The airflow is generated by the propeller and/or by the movement of the aircraft on which the turbomachine is mounted.

The unducted fan can be located upstream of the separation nozzle or downstream.

The compressor can be a low-pressure or booster compressor.

The primary flow is compressed over at least part of its stroke by at least some of the compressor blades. The secondary flow does not "see" the compressor. The secondary flow is virtually unlimited in size, as there is no shroud surrounding it (radially outwards). Tertiary flow is distinct from secondary flow. The tertiary flow can converge with and/or diverge from the primary flow.

At least one of the compressor's rotor blade rows is located downstream of the heat exchanger, which, in other words, means that the compressor draws air from the secondary flow and drives it through the heat exchanger.

This so-called downstream part of the compressor is located in an annular zone where the primary and tertiary flows converge.

This arrangement enables the exchanger to be fed with air that is sufficiently cold and sufficiently slow to ensure both oil cooling efficiency and limited aerodynamic losses due to the presence of the exchanger.

According to an advantageous embodiment of the invention, the compressor comprises an upstream part with at least one annular row of blades and a downstream part with at least one annular row of blades, and only the downstream part of the compressor is traversed by air from the tertiary flow coming from the exchanger. This keeps the primary flow, whose pressure and speed increase rapidly, separate from the tertiary flow. The heat exchanger does not "see" the upstream part of the compressor and thus retains its cooling capacity.

According to an advantageous embodiment of the invention, the blades of the downstream part have a much greater radial height than the blades of the upstream part, preferably in various instances the blades of the downstream part are between 1.5 and 4 times higher radially than the blades of the upstream part of the compressor. In this way, the tertiary flow is not subjected to a significant velocity gradient at the exchanger outlet, which would result in aerodynamic turbulence and hence losses in both cooling efficiency and engine output.

According to an advantageous embodiment of the invention, the downstream part of the compressor that the air encounters downstream of the exchanger comprises a single annular row of rotor blades. This makes the whole unit more compact. These blades can be arranged in the form of a bladed wheel. In addition, the downstream section can comprise one or two rows of stator blades. The number of blades in the downstream section can be set according to the space available and/or the desired compression ratio, so as to both draw in the tertiary flow at the desired speed and not impede compression of the primary flow, a key parameter in the efficiency of the turbomachine.

According to an advantageous embodiment of the invention, the air flow leaving the exchanger passes through all the annular rows of compressor blades.

According to an advantageous embodiment of the invention, an opening enables part of the secondary flow to be drawn in to form the tertiary flow, the opening being non-intaking. Thus, in a certain way, the opening can be delimited by an upstream edge and a downstream edge, the upstream and downstream edges having an identical radial position. Alternatively, the upstream edge is further away from the turbomachine axis than the downstream edge, for example 1.1 times further away. Alternatively, viewed in axial section, the tangent to the air-guiding surface upstream of the opening describes a direction approaching the axis, and the opening is contained between the axis and this tangent. In any case, this prevents the opening creating the tertiary flow from encouraging foreign bodies to enter the exchanger in the manner of a scoop.

According to an advantageous embodiment of the invention, the channel and/or exchanger extend circumferentially 360° around the axis of the turbomachine. Alternatively, the exchanger and/or channel do not extend over 360°. Regardless of the angle described by the exchanger around the axis, the opening into the secondary flow can be partial (i.e., not describing 360°) and/or the mouth of the channel on the compressor blades can be partial (i.e., not describing) 360°.

According to an advantageous embodiment of the invention, a propeller is arranged upstream of the nozzle and/or vanes straightening the secondary flow axially overlap the downstream part of the compressor. Alternatively, the propeller can be arranged downstream of the spout. Alternatively, two propellers with opposite directions of rotation are arranged at an axial position downstream of the exchanger.

According to an advantageous embodiment of the invention, a by-pass is arranged downstream of the downstream part of the compressor to divert part of the flow leaving the compressor to the secondary flow. The bypass is thus directly downstream of the convergence zone of the primary and tertiary flows (when they converge). This accelerates the flow to create thrust and compensate for the volume of air extracted in the tertiary flow upstream of the exchanger. This improves motor efficiency. The bifurcation of the bypass towards the secondary flow also enables any foreign bodies potentially drawn in upstream of the primary and tertiary flows to be evacuated, to prevent them from making their way to the high-pressure compressor or combustion chamber downstream of the primary flow.

According to an advantageous embodiment of the invention, means are provided to isolate the primary flow from the tertiary flow, the latter flowing into the channel, through the downstream part of the compressor and then into the bypass. In this way, the tertiary flow is completely isolated from the primary flow, limiting disturbances downstream of the exchanger. However, the two flows are not completely independent dynamically, since they both "see" a respective part of the same row of rotor blades downstream of the exchanger.

According to an advantageous embodiment of the invention, at least the last annular row of blades of the downstream part has an intermediate circumferential ring. This last row can be made up of rotating or fixed blades. The circumferential ring guides the flow to the bypass or to the high-pressure compressor. In connection with the above paragraph, the ring can also help isolate the tertiary flow from the primary flow.

The invention also relates to a process for cooling the oil of a turbomachine with an unducted fan, comprising: separating an air flow into a primary flow and a secondary flow by means of a separation nozzle, the primary flow being compressed by one or more compressor(s) of the turbomachine and the secondary flow being external to the compressor(s); and generating a tertiary flow passing through an air/oil exchanger by means of at least one annular row of rotor blades of a compressor, the tertiary flow being drawn from the secondary flow.

Finally, the invention relates to a method for using the turbomachine according to one of the above-mentioned embodiments, comprising a propeller rotation step during which the primary flow and the secondary flow have a Mach number of 0.5, and the tertiary flow has a Mach number much lower than 0.3.

The invention is particularly advantageous in that it enables cold air to be circulated through the exchanger at a suitable speed, thus ensuring efficient cooling without compromising engine efficiency or requiring additional, cumbersome means.

Good cooling efficiency means that the exchangers used are smaller and therefore less bulky, less heavy and less costly.

DRAWINGS

FIG. 1 shows a first exemplary embodiment of the invention.

FIG. 2 shows a second exemplary embodiment of the invention.

FIG. 3 shows a third exemplary embodiment of the invention.

FIG. 4 illustrates a fourth exemplary embodiment of the invention.

DETAILED DESCRIPTION

In the following description, the terms "internal" and "external" refer to positioning in relation to the axis of rotation of a turbomachine. The axial direction corresponds to the direction along the turbomachine's axis of rotation. The radial direction is perpendicular to the axis of rotation. Upstream and downstream refer to the direction of flow in the turbomachine.

The figures show the elements schematically and are not to scale. In particular, some dimensions are enlarged to make the figures easier to read.

FIG. 1 illustrates a turbomachine 2 according to a first variant. A propeller 4 attached to a hub 6 rotates around an axis 8.

The turbomachine 2 moves in an air stream F, whose motion relative to the turbomachine 2 is generated by the rotation of the propeller 4 and the forward motion of the aircraft on which the turbomachine 2 is mounted.

In a non-illustrated variant, which can be similar to one of the examples described in document WO 2020/084271 A1, the propeller 4 is arranged in a downstream part of the turbomachine 2 and can optionally be supplemented by a second propeller having an opposite direction of rotation.

The air flow F is split into a primary flow F1 and a secondary flow F2 at a separation nozzle 10.

The primary flow F1 meets a rectifier inlet vane ("IGV") 11 and enters a vein 12, while the secondary flow F2 remains radially outside any shroud. The casing 13 delimits the outside of vein 12. Fixed shells and rotating wheel hubs delimit vein 12 internally. Structural arms ("struts") (see 13.1 on figure FIG. 2) also pass through vein 12, taking up the forces of casing 13.

A compressor 14 is designed to compress the primary flow F1. To achieve this, compressor 14 is equipped with alternating rotor blades 16, 18, 20, 22 and stator blades 17, 19, 21, arranged in annular rows around axis 8.

FIG. 1 shows only the upstream part of the turbomachine. Downstream of compressor 14, the primary flow F1 continues to a second compressor, a combustion chamber and one or more turbines (not shown). Rotation of the turbine(s) drives rotation of the hub 6, propeller 4 and rotor blades 16, 18, 20, 22.

The rotating elements are supported by bearings, and the turbomachine can include a gearbox between different rotating elements. The bearings and gearbox of turbomachine 2 are lubricated by an oil that must be maintained within a given operating temperature range. A heat exchanger 24 is therefore provided to cool the oil by passing it through ducts that are cooled by a flow of air.

The exchanger 24 is arranged in a channel 26 in which a so-called tertiary flow F3 circulates. Channel 26 can extend circumferentially over all or part of the turbomachine, i.e., 360° around axis 8 or less. Similarly, the heat exchanger 24 can occupy all or part of the channel 26 and thus extend over a large angular portion around axis 8 and in particular 360°.

Channel 26 has an opening 28 which opens onto the space through which the secondary flow F2 passes. The opening 28 is delimited by the fairing upstream by an upstream edge 30 and downstream by a downstream edge 32. The upstream edge 30 and the downstream edge 32 are at approximately the same radial height, to prevent any foreign elements present in the flow F from being diverted towards the exchanger 24.

The opening 28 is thus such that the velocity of flow F3 has a significant radial component when it is formed upstream of channel 26. In particular, this ensures that the velocity of flow F3 as it passes through the exchanger is much lower than the velocity of the primary flow F1 in vein 12. Thus, the geometry can be such that when the F1 flow is at a Mach number in the range 0.45 to 0.6 (usually 0.5), the F3 flow seen by the exchanger is well below a Mach number of 0.3. These values ensure efficient cooling at cruising speed.

Opening 28 can be fitted with a protective grille (not shown) or a flap to open or close off access for secondary flow F2 to channel 26.

Compressor 14 consists of an upstream part 14.1, which comprises the blades arranged in duct 12, and a downstream part 14.2. The downstream part 14.2 comprises at least one rotor blade 20, 22 which generates the flow F3, creating a vacuum at the opening 28.

Once it has passed through exchanger 24, tertiary flow F3 returns to downstream compressor section 14.2. In this first embodiment, the F3 flow converges with the F1 primary flow.

The blades 20, 21, 22 in the downstream section 14.2 have a radial height H between 1.5 and 4 times the radial height h of the blades 16, 17, 18, 19 in the upstream section 14.1.

FIG. 1 shows in dotted lines the possible position of an annular row of vanes 34, fixed around axis 8 and straightening the flow F2. The vanes 34, as well as the propeller blades 4, can have a variable orientation (around the direction of their largest dimension).

The number of compressor blades 14 forming the downstream part 14.2, i.e., the number of blades seen by the tertiary flow F3 leaving the channel 26, can vary.

Thus, in the embodiment shown in FIG. 2, the entire compressor is arranged in the downstream section 14.2, with no compressor blades placed in the flow path 12.

In comparison with FIG. 1, the section 12 can, for example, be axially shorter, and can comprise only a row of inlet vanes 11 and support arms 13.1.

In a third embodiment of the invention, a bypass channel 36 is arranged to divert part of the flow to the secondary flow F2.

The by-pass 36 is arranged downstream of the compressor 14 to divert part of the flow leaving the compressor to the secondary flow F2. In this way, a second separation nozzle 38 separates the flow seen by the downstream part 14.2 of the compressor into a primary flow F1, which continues on its way to a high-pressure compressor and the combustion chamber, and a quaternary flow F4, which returns to the secondary flow F2.

An outer shroud 40 radially delimits channel 26 and bypass 36, and internally delimits flow F2.

In addition to its heat exchange function with the heat exchanger, the quaternary flow F4 has a thrust function complementary to the flow F2. Any pressure losses in flow F3 due to interaction with exchanger 24 are compensated for by the blades in downstream section 14.2, to re-establish sufficient pressure in quaternary flow F4 before it returns to secondary flow F2.

A compromise is thus achieved between a pressure low enough to promote heat exchange in duct 26 and a pressure high enough in bypass 36 to promote thrust.

FIG. 4 illustrates a variant in which a single row of blades occupies the downstream section 14.2 of compressor 14. To structurally support the outer shroud 40 in the absence of stator blades in the downstream part 14.2, structural arms 42 can be placed in the bypass 36, and/or in the channel 26 (not shown).

FIG. 4 also illustrates an aspect that can be applicable to the embodiment shown in FIG. 3, namely the isolation between the primary flow F1 and the tertiary flow F3. The quaternary flow F4 of FIG. 3 is therefore the tertiary flow F3: each air particle passing through exchanger 24 continues its path through bypass 36.

Means such as seals or rings are provided to isolate the primary flow from the tertiary flow.

In this respect, FIG. 4 shows a circumferential ring 44 linking the blades of the rotor blade row of the downstream section 14.2 circumferentially from close to each other. This ring is arranged radially at the level of the nozzle 38 and the shroud 13.

In a variant not shown, where the downstream part 14.2 comprises several rows of blades (as in FIG. 3), a ring of the same type can be placed on all the blade rows. Alternatively, a ring can be provided only on the last blade row of the downstream section 14.2 to prepare for flow separation between the primary flow to the high-pressure compressor and the bypass 36, thereby only partially isolating the primary flow from the tertiary flow.

It should be noted that the invention is not limited to the examples shown in the figures. In particular, the teachings of the present invention are also applicable to a turbomachine with a shrouded propeller.

Every technical feature of each illustrated example is applicable to the other examples. In particular, the number of blades in the downstream section, the presence or absence of a bypass, the position of the propeller or the straightening vane, the presence of a circumferential ring, etc., can be taken from one embodiment and applied to another.

What is claimed is:

1. Turbomachine of the unducted fan type, comprising:
    a separation nozzle splitting an air flow into a primary flow and a secondary flow;
    a compressor compressing the primary flow; and
    an air/oil heat exchanger;
    wherein the exchanger is positioned in a channel traversed by a tertiary flow, the tertiary flow being drawn from the secondary flow upstream of the exchanger and meeting, downstream of the exchanger, at least one annular row of rotor blades of the compressor, wherein the primary flow and the tertiary flow have the same flow direction, both flowing downstream along an axis of rotation of the turbomachine.

2. Turbomachine according to claim 1, wherein the compressor comprises an upstream part with at least one annular row of blades and a downstream part with at least one annular row of blades, and only the downstream part of the compressor is crossed by air from the tertiary flow coming from the exchanger.

3. Turbomachine according to claim 2, wherein the blades of the downstream part have a radial height much greater than the blades of the upstream part, the blades of the downstream part are between 1.5 and 4 times higher radially than the blades of the upstream part of the compressor.

4. Turbomachine according to claim 2, wherein the downstream part of the compressor that the air meets downstream of the exchanger comprises a single annular row of rotor blades.

5. Turbomachine according to claim 2, wherein the downstream part of the compressor that the air meets downstream of the exchanger comprises one or two annular rows of stator blades.

6. Turbomachine according to claim 1, wherein the air flow leaving the exchanger passes through all the annular rows of blades of the compressor.

7. Turbomachine according to claim 1, wherein an opening allows part of the secondary flow to be sucked in to form the tertiary flow, the opening being non-intaking.

8. Turbomachine according to claim 1, wherein the channel and the exchanger extend circumferentially over 360° around the axis of the turbomachine.

9. Turbomachine according to claim 1, wherein a propeller is arranged upstream of the nozzle.

10. Turbomachine according to claim 2, wherein vanes straightening the secondary flow axially overlap the downstream part of the compressor.

11. Turbomachine according to claim 1, wherein two propellers with opposite directions of rotation are arranged at an axial position downstream of the exchanger.

12. Turbomachine according to claim 2, wherein a bypass is arranged downstream of the downstream part of the compressor to divert part of the flow leaving the compressor to the secondary flow.

13. Turbomachine according to claim 12, wherein means are provided to isolate the primary flow from the tertiary flow, the latter flowing into the channel through the downstream part of the compressor and then into the bypass.

14. Turbomachine according to claim 13, wherein at least the last annular row of blades of the downstream part has an intermediate circumferential ring.

15. A method for cooling the oil of a turbomachine with an unducted fan, comprising:
   separating an air flow into a primary flow and a secondary flow by means of a separation nozzle, the primary flow being compressed by one or more compressors of the turbomachine and the secondary flow being external to the compressor(s);
   generating a tertiary flow passing through an air/oil exchanger by means of at least one annular row of rotor blades of a compressor, the tertiary flow being drawn from the secondary flow, wherein the primary flow and the tertiary flow have the same flow direction, both flowing downstream along an axis of rotation of the turbomachine.

* * * * *